J. F. SINCAGE.
TIRE.
APPLICATION FILED JULY 12, 1916.
1,228,071.
Patented May 29, 1917.
Fig. 1.
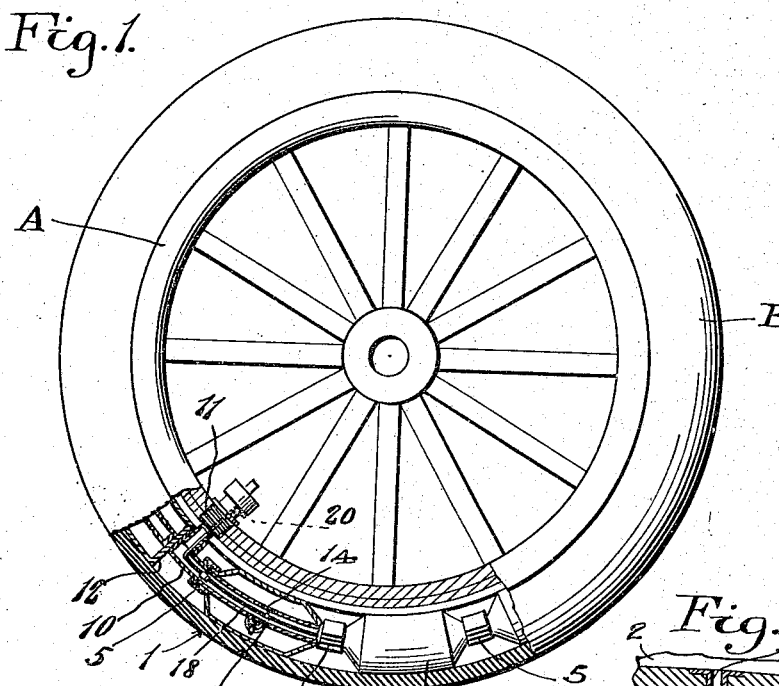
Fig. 2.
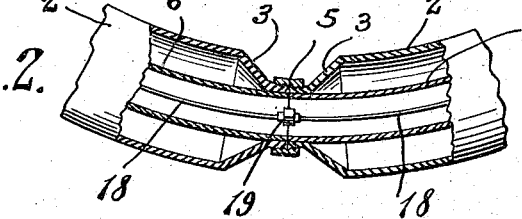
Fig. 5.
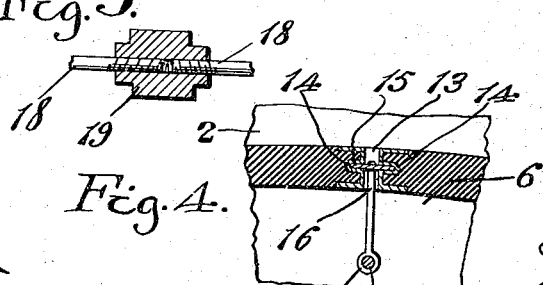
Fig. 4.
Fig. 6.
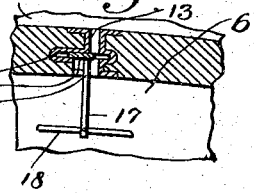
Fig. 3.
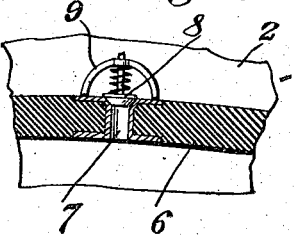
Witnesses
J. P. Wahler.
James J. Donegan.
Inventor
J. F. Sincage.
By Randolph Jo.
Attorney

UNITED STATES PATENT OFFICE.

JOSEPH F. SINCAGE, OF FLORENCE, MASSACHUSETTS.

TIRE.

1,228,071.  Specification of Letters Patent.  Patented May 29, 1917.

Application filed July 12, 1916. Serial No. 108,912.

*To all whom it may concern:*

Be it known that I, JOSEPH FRANCIS SIN-CAGE, a citizen of the United States, residing at Florence, in the county of Hampshire and State of Massachusetts, have invented certain new and useful Improvements in Tires; and I do hereby declare the following to be a full, clear, and exact description of the invention, such as will enable others skilled in the art to which it appertains to make and use the same.

This invention relates to improvements in inner tubes of the sectional type for pneumatic tires, and an object of the invention is to associate with the sections an air distributing tube, also formed of sections, and which is arranged in communication with the tire inflating valve, and is provided with a plurality of valves adapted to open under pressure of air admitted to the distributing tube so as to admit of the sections forming the inner tube being inflated and also provided with a series of manually operated valves designed to be opened when desired to admit of the escape of air from the sections forming the inner tube.

Another object of this invention is the provision of an inner tube of this character, that will be of simple and durable construction, cheap to manufacture and can be placed within any type of tire shoe.

Other objects will appear and be better understood from that embodiment of my invention of which the following is a specification, reference being had to the accompanying drawing forming a part thereof, in which:

Figure 1 is a side elevation of a vehicle wheel equipped with a tire constructed in accordance with my invention, showing the outer casing or shoe partially in section to show the construction of the inner tube.

Fig. 2 is a sectional detail view of the connection between the adjacent sections of the inner tube, Fig. 3 is a detail section, taken through one of the sections of the distributing inner tube, and showing the inlet valve therein, Fig. 4 is a detail transverse sectional view taken through the inner wall of one of the sections forming the distributing tube and through the slide valve in the section and showing the manner of mounting the valve in position.

Fig. 5 is a detail sectional view of the connection between adjacent sections forming the inner tube.

Fig. 6 is a detail longitudinal view taken through the inner wall of one of the sections, forming the distributing tube, and through the slide valve, and showing the valve in a partly opened position.

Referring to the drawing in detail, the letter A designates a vehicle wheel, having a tire shoe B associated therewith and secured thereto in any suitable manner.

The inner tube of the tire is designated, as an entirety, by the numeral 1 and is formed of a plurality of tubular sections 2. Each of the sections 2 has the opposite ends of the walls thereof deflected inwardly, as shown at 3, and terminally formed to provide a threaded nipple 4. Threaded sleeves 5 connect opposed nipples of adjacent sections 2, so as to hold all of the sections in tube formation.

An air distributing tube extends through the sections 2 and is formed of sections designated 6. Each section 6 of the distributing tube is of a length corresponding to the length of the adjacent section 2, and has the ends thereof vulcanized to the inner surface of the nipples 4 at the ends of the adjacent sections 2. Each of the sections 6 has an outlet port 7 therein, the outer end of which is formed to provide a seat for a spring pressed valve 8, the said valve having a stem operable through a guide 9 that is associated with the sections 6, as shown in Fig. 3 of the drawing.

One section 6 of the distributing tube has one end projecting a distance beyond the adjacent end of the section 2, as shown at 10, and is connected with an inflating valve 11, which has a casing extending through an opening in the rim of the wheel A. The inner tube 1 has the end of that section 2 opposite the extended end 10 of the opposed section 6 of the distributing tube closed by means of a head 12.

When air is admitted through the inflating valve 11 to the distributing tube the air pressure will effect the unseating of the valve 8 and admit of the air passing from the sections 6 of the distributing tube to the interior of the respective sections 2 of the inner tube and inflate the same.

The sections 6 forming the air distributing tube are provided, at points opposite the valve 8, with ports 13. Each of these ports 13 has the walls thereof provided with guide grooves 14, which receive the opposite edges of a slide valve 15. The valves 15 have inwardly extending stems 16 carried thereby, and the inner ends of the stems are provided with eyes 17, which have connection with a valve operating rod 18. The valve operating rod 18 is formed of sections, and the opposed ends of adjacent sections are provided with threaded portions of opposite pitch, as shown in Fig. 5, and are connected by means of a sleeve nut 19. The rod 18 has the end of the section that extends through the extended end 10 of one of the sections 6 of the distributing pipe extended upwardly through the inflating valve 11, as shown at 20. When it is desired to deflate the sections 2 of the inner tube 1, the extended end 20 of the valve operating rod 18 is pulled upwardly, resulting in the sliding of the rod 18 and effect sliding of the valves 15 to uncover the ports 13 to admit of the escape of air from the sections 2 into the air distributing tube and then out through the valve 11.

It is evident that various changes might be resorted to in the construction, form and arrangement of the several parts without departing from the spirit and scope of my invention.

Having thus described the invention what is claimed as new, is:

1. An inner tube comprising a plurality of inflatable sections, an air distributing tube extending through the sections and provided with ports, certain of the ports having grooves therein, valves slidably mounted in the grooves, pressure operated valves covering the other of the ports, stems depending from the first-mentioned valves, and an operating member connected to the stems.

2. An inner tube for a tire comprising a plurality of inflatable sections, means for connecting the sections to each other, an air distributing pipe extending through the sections and formed of sections, each of the sections of the air distributing pipe having opposed ports therein for establishing communication between the sections of the air distributing pipe and the adjacent inflatable sections, pressure operated valves closing certain of the ports in the sections of the distributing pipe, valves for closing the other ports in the sections of the distributing tube, an operating rod extending through the distributing tube and stems carried by the last-mentioned valves and having connection with the operating rod so as to effect the simultaneous unseating of all of the last-mentioned valves when the operating rod is moved in one direction for the purpose specified.

In testimony whereof I affix my signature in presence of two witnesses.

JOSEPH F. SINCAGE.

Witnesses:
 MARY URBON,
 ANNA M. STACK.

Copies of this patent may be obtained for five cents each, by addressing the "Commissioner of Patents, Washington, D. C."